United States Patent [19]

Ando et al.

[11] 4,006,944
[45] Feb. 8, 1977

[54] SPINDLE DEVICE HAVING BEARINGS LUBRICATED WITH OIL JET

[75] Inventors: Shigenori Ando; Masato Ota; Tadashi Kawashima, all of Narashino, Japan

[73] Assignee: Kabushiki Kaisha Daini Seikosha, Japan

[22] Filed: Aug. 4, 1975

[21] Appl. No.: 601,428

[30] Foreign Application Priority Data

Aug. 2, 1974   Japan ..................... 49-92444[U]

[52] U.S. Cl. .............................. 308/187; 184/6.22
[51] Int. Cl.$^2$ .......................................... F16C 1/24
[58] Field of Search .......... 308/106, 107, 112, 116, 308/122, 123, 169, 76, 78, 187; 184/6.22, 6.26, 55 A

[56] References Cited

UNITED STATES PATENTS

| 3,042,462 | 7/1962 | Rosskopf ......................... 308/187 |
| 3,729,064 | 4/1973 | Wolf et al. ..................... 184/6.22 X |

Primary Examiner—Philip Goodman
Assistant Examiner—Gene A. Church
Attorney, Agent, or Firm—Robert E. Burns; Emmanuel J. Lobato; Bruce L. Adams

[57] ABSTRACT

A spindle device has pre-loaded anti-friction bearings which are so lubricated with oil jet accelerated through jet nozzles facing thereto that very high speed rotation with lower levelled vibration is permitted for the spindle.

The spindle assembly has a rear bearing holder longitudinally slidable in the housing for pre-loading and cooling oil flows in the bearing holder. The spindle assembly further has a high frequency electric motor therein and is sealed up against dust penetration from outside.

Air or oil vapor is prevented from staying in the sealed spindle assembly by a gas outlet which is provided in the assembly. Jetted oil toward the bearings and bearing holder cooling oil are recollected through a suction pump into a reservoir, and are fed by a pressurizing pump from the reservoir to the spindle assembly. Oil is there cooled by a cooling device.

The circulating oil temperature and oil amount are detected by sensors to be observed.

8 Claims, 9 Drawing Figures

SPINDLE DEVICE HAVING BEARINGS LUBRICATED WITH OIL JET

BACKGROUND OF THE INVENTION

The present invention relates to a spindle device in which the spindle bearings are lubricated with an oil jet.

Oil jet lubrication has proved superior to oil mist lubrication for very high speed bearings, cooling and lubricating them much better than oil mist which is now generally used for lubricating very high speed precision ball bearings in machine tools or others.

Experimental oil jet lubrication has been successful in laboratories, but the practical use was not yet realized because of problems in expensive oil consumption and environmental oiling.

SUMMARY OF THE INVENTION

The present invention relates to a spindle device in which the spindle bearings are lubricated with an oil jet.

An object of this invention is to provide a spindle device having spindle bearings lubricated with oil jets in which lubricating oil is circulated without leaking out and without dust-mingling.

Another object of the invention is to provide a spindle device, such as an internal grinding spindle, suitable for very high speed rotation with low noise and vibration.

Still another object of the invention is to provide a lubricating device which maintains reliable refreshed oil supply for oil jet lubrication of the spindle.

BRIEF DESCRIPTION OF THE DRAWINGS

Further objects and features of the present invention will now be described references being made to the attached drawings in which.

DETAILED DESCRIPTION OF THE PREFERRED EMBODIMENTS

Figure 1:
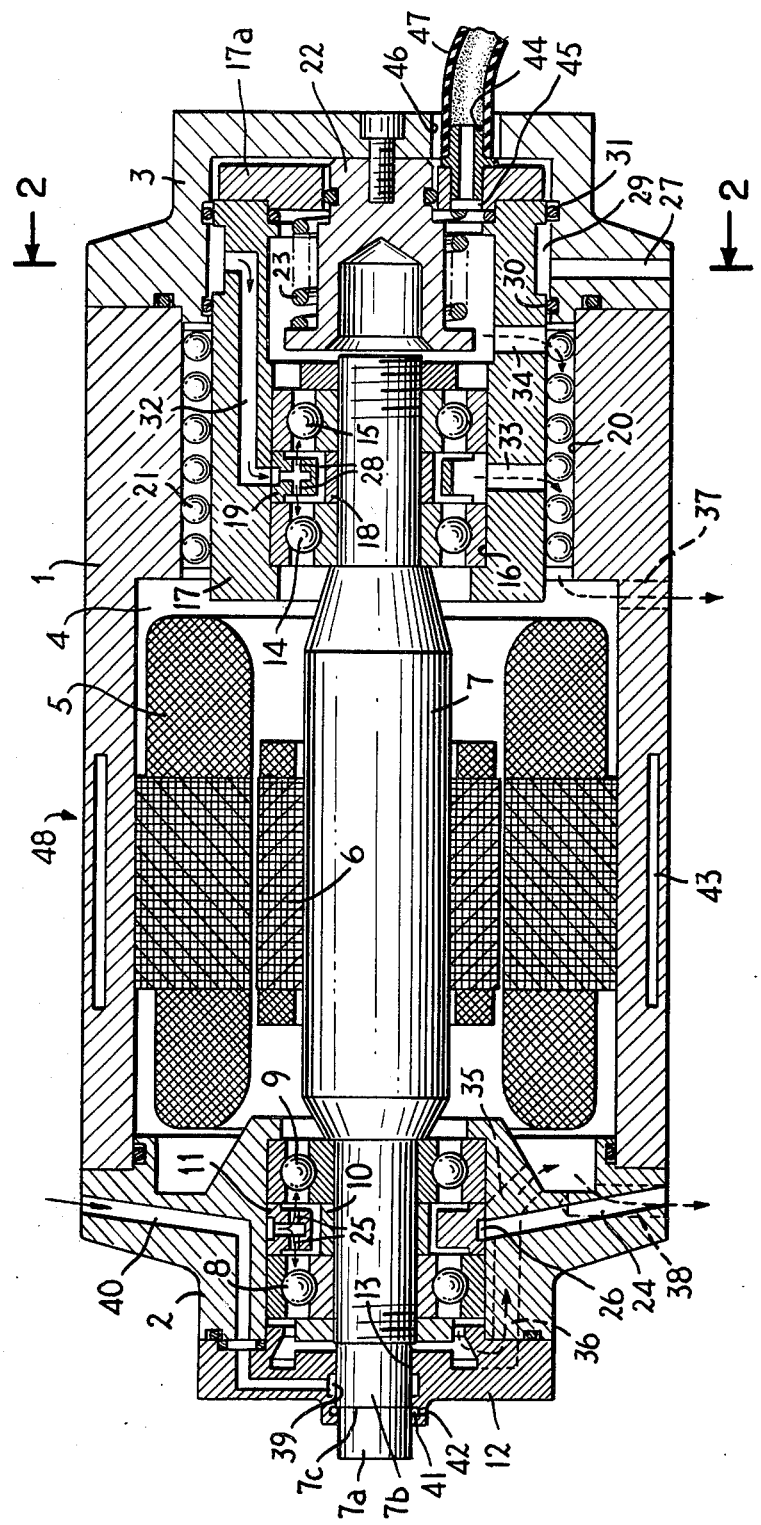
FIG. 1 is a longitudinal sectional view showing a spindle assembly according to this invention.

In the accompanying drawings, FIG. 1 shows a spindle assembly in which numeral 1 designates a cylindrical spindle housing which is provided with a front cover 2 and a rear cover 3, these three members forming a complete housing and surrounding a sealed space 4 therein. A high-frequency motor stator 5 is mounted in housing 1 through which a motor rotor 6 securely fixed on a spindle 7 is rotatably inserted.

A pair of bearings 8 and 9 is mounted in the front cover 2, inserting spacers 10 and 11 therebetween and rotatably supporting the front portion of the spindle 7. A bearing cover 12 is securely fixed on the front end of front cover 2 covering bearings 8 and 9. Bearing cover 12 is provided with a center opening 13 through which the nose of spindle 7 protrudes out from the housing.

The other pair of bearings 14 and 15 is mounted on the center hollow 16 of a bearing holder 17, inserting spacers 18 and 19 therebetween and rotatably supporting the rear portion of spindle 7. Bearing holder 17 is supported axially slidable on the rear hollow 20 of housing 1 inserting a ball slider 21 therebetween.

A flange-shaped block 22 is securely fixed on the bottom of rear cover 3, the projected end thereof entering into center hollow 16 of bearing holder 17 with a little gap between the rear end of spindle 7 and also extending through an annular plate 17a which is fixed on the rear end of bearing holder 17. A spring 23 is set compressed between the top flange of block 22 and annular plate 17a so as to preload the bearings 8, 9, 14 and 15.

Numeral 24 designates an oil-supplying path formed in front cover 2 for supplying oil to oil jet nozzles 25, 25 which are provided in outer spacer 11 facing the corresponding bearings 8 and 9. Oil is sent from oil-supplying path 24 to nozzles 25, 25 through an annular groove 26 round outer spacer 11 and is jetted out toward bearings 8 and 9 from nozzles 25, 25.

Numeral 27 designates another oil-supplying path which is formed in rear cover 3 for supplying oil to oil jet nozzles 28, 28. Rear oil jet nozzles 28, 28 are provided in outer spacer 19 facing the corresponding bearings 14 and 15. Rear oil-supplying path 27 is connected to an annular groove 29 of bearing holder 17, both side gaps thereof between the inner wall of rear cover 3 and the outer perphery of bearing holder 17 being sealed with O-rings 30 and 31. Oil is sent from oil-supplying path 27 to nozzles 28, 28 through groove 29 and a path 32 as shown with arrows in FIGS. 1 and 2, cooling bearing holder 17, and is jetted out toward bearings 14 and 15 from nozzles 28, 28.

Numerals 33, 34, 35 and 36 designate oil recollecting pathes, pathes 33 and 34 being formed in the lower portion of bearing holder 17 passing jetted and bearing-lubricated oil through to the gap of ball slider 21 and pathes 35 and 36 formed in the lower portion of front cover 2 passing oil through to inner space 4.

Numerals 37 and 38 are also oil recollecting pathes formed in the lower portion of housing 1. Oil gathered in the bottom of inner space 4 is sent outside of the housing through pathes 37 and 38.

An annular recess 39 formed on center opening 13 of bearing cover 12 surrounds spindle 7 and is connected to an air supply (not shown in drawings) with air path 40.

The nose 7a of spindle 7 is a little smaller in diameter than its adjacent portion 7b which is surrounded by recess 39. An outer annular recess 41 formed on center opening 13 and provided with a bottom hole 42 surrounds the boundary shoulder 7c between nose 7a and its adjacent portion 7b.

A cylindrical groove 43 is formed in housing 1. This groove surrounds stator 5 almost full round and is provided with cooling water inlet and outlet (not shown) at the ends thereof.

Annular plate 17a is provided with an exhaust connecter 44 attached to an opening 45 thereof. Connector 44 protrudes into a hollow 46 formed in rear cover 3 and connects inner space 4 to an outer hose 47.

Figure 2:
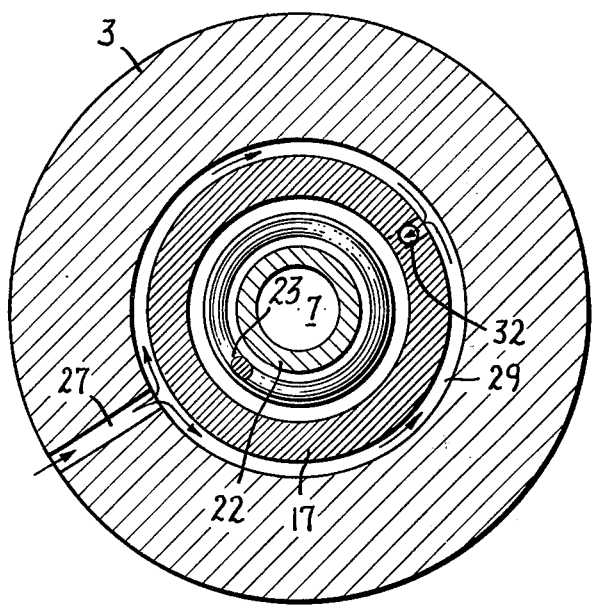
FIG. 2 is a cross-sectional view taken on line II—II in FIG. 1 showing a rounding cooling path of a bearing holder.
Figure 3:
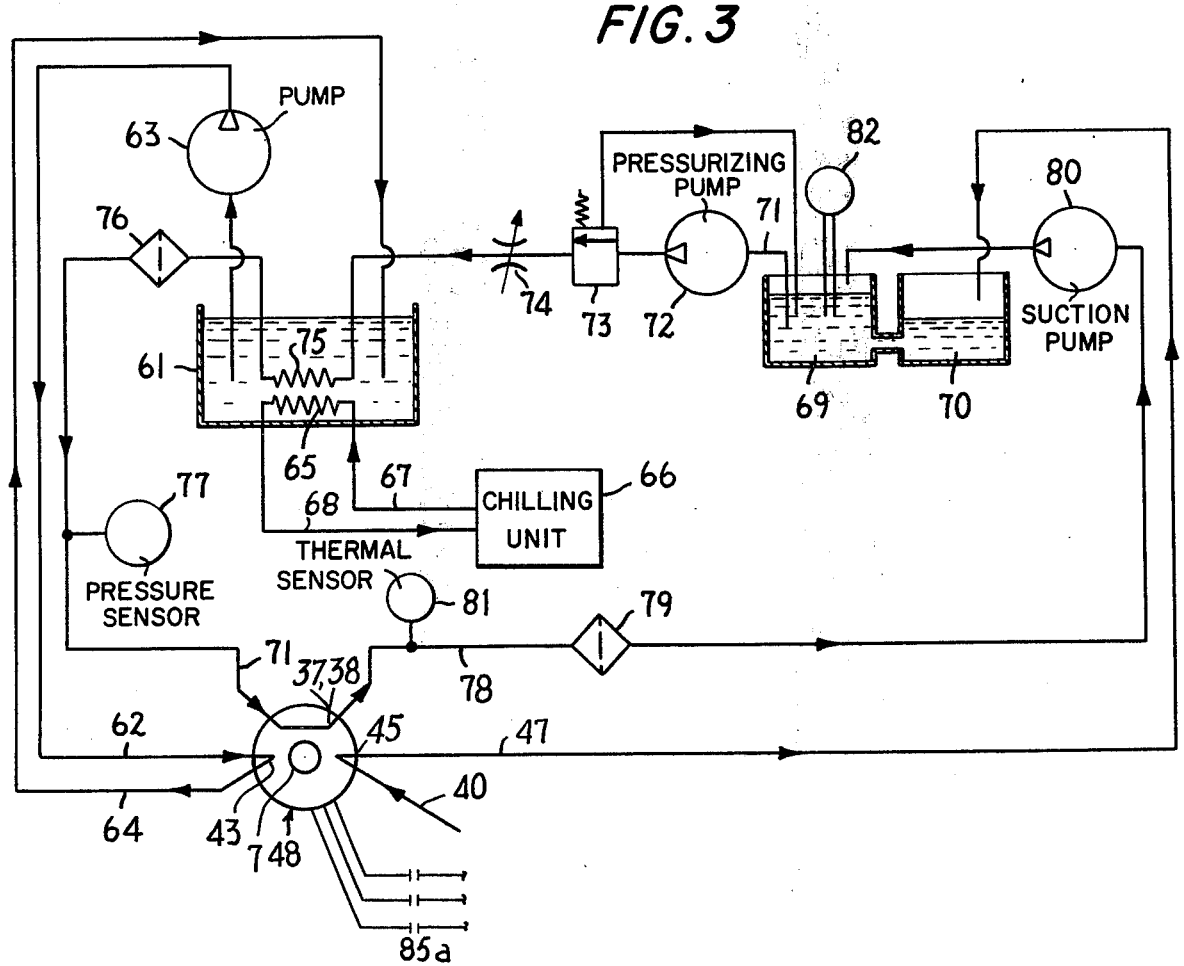
FIG. 3 is a block diagram showing a whole spindle device, including the spindle assembly and a lubricating oil device, according to the invention.

Referring now to FIG. 3 which shows a whole system in a spindle device according to this invention, the spindle assembly shown in FIGS. 1 and 2 is designated with reference numeral 48.

Numeral 61 designates a cooling water bath filled with cold water, from which cooling water is sent to cylindrical groove 43 through piping 62 by means of a pump 63, cooling motor stator 5 and rotor 6 and returning to water bath 61 through a return piping 64.

In cooling water bath 61 is immersed a coiled chilling pipe 65, which is connected to a chilling unit 66 with supplying and returning pipings 67 and 68, to chill the cooling water in bath 61.

Numerals 69 and 70 designate respectively an oil reservoir and a sub-reservoir, interconnected with each other. Oil supplying piping 71 is arranged to connect oil reservoir 69 to oil supplying pathes 24 and 27 of spindle assembly 48. An oil pressurizing pump 72, a check valve 73, a flow-control valve 74, a coiled oil pipe 75 and a filter 76 are arranged in oil supplying piping 71 in series. Coiled oil pipe 75 is immersed in cooling water bath 61 so that supplying oil pressurized by pump 72 is cooled there by cooling water. Supplying piping 71 is provided with a pressure sensor 77 near oil inlet of spindle assembly 48.

Oil returning piping 78 is arranged to connect oil outlets 37 and 38 of spindle assembly 48 to oil reservoir 69. A magnetic filter 79 and a suction pump 80 are in series arranged in returning piping 78, and a thermal sensor 81 is attached on return piping 78 near outlets 37 and 38 to detect oil temperature.

Hose 47 from air outlet 45 of spindle assembly 48 reaches into sub-reservoir 70.

An oil-level sensor 82 is mounted on oil reservoir 69 to detect oil level.

Figure 4:
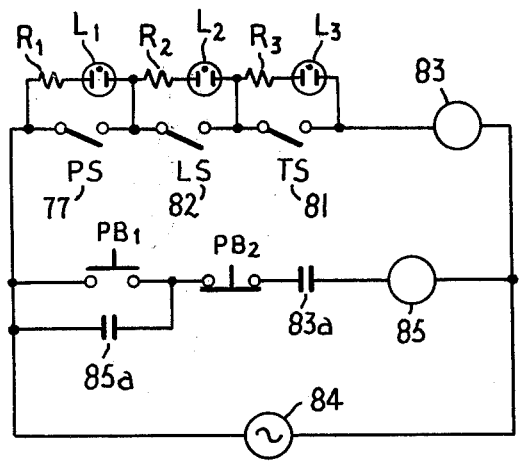
FIG. 4 is a circuit diagram showing a circuit for the device in FIG. 3.

Pressure sensor 77, thermal sensor 81 and oil-level sensor 82 have respectively electric contacts which are shown in FIG. 4, respectively with the same reference numerals as the sensors. These contacts are normally open and arranged in series with a sub-relay solenoid 83 between terminals of electric source 84. Neon lamps $L_1$, $L_2$ and $L_3$, each having a resistance $R_1$, $R_2$ or $R_3$ in series are respectively connected in parallel with contacts 77, 82 and 81.

A normal open push-button switch $PB_1$, a normal closed pushbutton switch $PB_2$, a normal open contact 83a of relay 83 and a main relay solenoid 85 are also connected between terminals of electric source 84, normal open button switch $PB_1$ having a normal open contact 85a of relay 85, for self-holding, in parallel.

The operation of the above-mentioned spindle device will be described hereinafter.

Before starting spindle rotation, oil pumps 72 and 80 start to work accompanying chilling unit 66 in operation, circulating lubricating oil through pipings 71 and 78 and spindle assembly 48. When oil reservoir 69 is filled with sufficient oil, circulating oil temperature is lower than a predetermined value and oil pressure in supplying piping 71 reaches a predetermined value, sensors 77, 81 and 82 all detect a ready state and close their contacts, which imposes a direct voltage from the electric source 84 on relay solenoid 83, energizing relay 83 and making contact 83a on.

The circuit is now ready to start the high frequency motor. Pushing-on of push button $PB_1$ makes relay 85 energize, causing all of its contacts 85a to close on. As a result, motor stator 5 is energized and spindle 7 rotates at high speed with rotor 6.

If the oil amount is insufficient for actuating oil level sensor 82 because of an oil leak, its contact becomes open, lighting neon lamp $L_2$, which causes the voltage on relay solenoid 83 to drop to deenergize the solenoid 83. Oil temperature over-rising or oil pressure drop effects the same deenergizing of solnoid 83, lighting neon lamp $L_3$ or $L_1$. In any of these cases, spindle driving is suddenly stopped.

Bearings 8, 9, 14 and 15 are lubricated sufficiently with oil jet from jet nozzles 25 and 28 during operation of pumps 72 and 80, so that spindle 7 rotates smoothly and without high vibration or noise.

Sealing air is supplied to annular recess 39 from air supply through air path 40, flowing in and out from recess 39. Outer dust penetration is, as a result, prevented on, accidental penetrating dust being turned aside through bottom hole 42 of outer annular recess 41.

Some of the sealing air from annular recess 39 flows into inner space 4, boosting the inner pressure thereof. Temperature rise of inner space 4 caused by high frequency motor and bearing heating, in addition, raises the pressure in the inner space 4. Over pressure in inner space 4 forces some air and oil to escape out mingled to sub-reservoir 70 through hose 47 and air is separated from oil therein.

Bearing holder 17 is cooled with oil flawing in annular groove 29 and path 32 thereof. Bearing holder 17 tends to reach a higher temperature than outer housing, as the former is insulated thermally from the outer members while the latter is directly held by a spindle stand (not shown in drawings) with its periphery directly on the concave surface of the stand.

Figure 5:
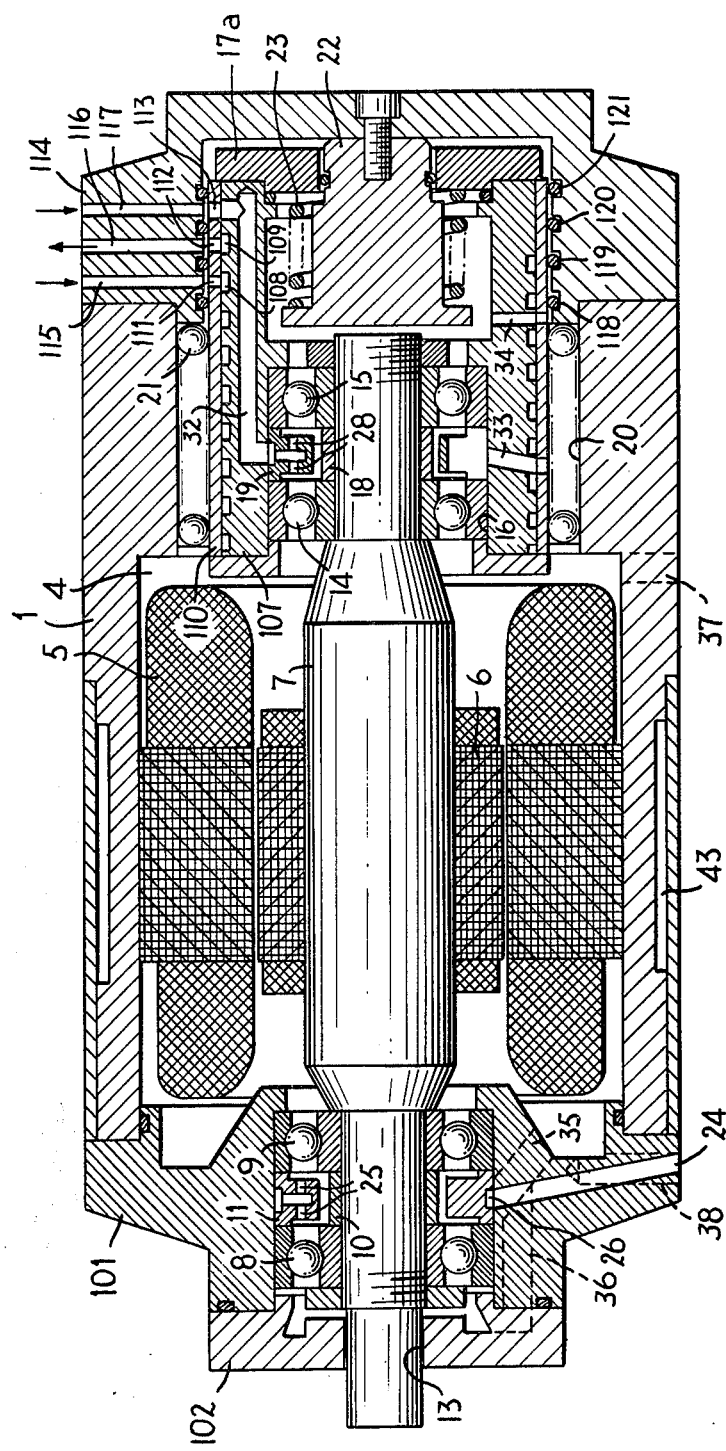
FIG. 5 is a longitudinal sectional view showing a third spindle assembly according to this invention.

Further bearing holder cooling means are illustrated in FIGS. 5, 6, 7, 8 and 9, in which FIG. 5 shows another spindle assembly according to this invention having helical cooling grooves on the outer periphery of its bearing holder and having no sealing means between the spindle and the bearing cover and further having no air outlet on the rear cover. FIGS. 6 to 9 show still another spindle assembly according to this invention having axial cooling hollows in its bearing holder and a safety valve on the rear cover. In these drawings reference numerals denoting like parts correspond to those in FIG. 1.

Referring to FIG. 5, a front cover 101 and a bearing cover 102 have no air sealing means therein and cover inner space 4, the nose of spindle 7 protruding through bearing cover center opening 13 with a slight gap therebetween.

A bearing holder 107 is provided with a pair of helical grooves 108 and 109 on the outer periphery thereof, forming a multi-helix. These grooves 108 and 109 are covered with a cylindrical member 110 which is securely fixed on bearing holder 107. Cylindrical member 110 has an opening 111 facing the rear end of groove 108 and another opening 112 facing the rear end of the other groove 109, both of the front end of grooves 108 and 109 being interconnected. Cylindrical member 110 further has an opening 113 facing path 32 in bearing holder 107. A rear cover 114 has three pathes 115, 116 and 117, path 115 facing opening 111, path 116 facing opening 112 and path 117 facing opening 113.

Numerals 118, 119 120 and 121 designate O-rings separating the gap between cylindrical member 110 and rear cover 114 into connecting pathes between the openings and the pathes.

Path 116 is connected to returning piping 78 together with oil recollecting pathes 37 and 38. Both of pathes 115 and 117 are connected to supplying piping 71 together with path 24.

In the device of FIG. 5, oil circulates through multi-helical grooves 108 and 109 cooling bearing holder 107 as well as through oil jet nozzles 25 and 28.

Figure 6:
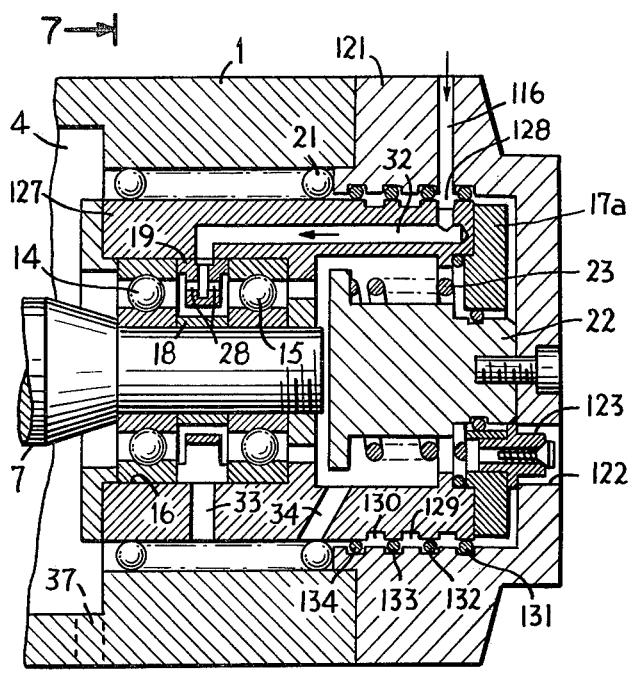
FIG. 6 is a partially longitudinal sectional view of still further embodied spindle assembly of the invention.

FIG. 6 is partial sectional view of another spindle assembly in whih the cut-away portion has the same design as that is FIG. 5 and reference numerals FIG. 6 correspond to those in FIG. 5.

A bearing holder 127 has three grooves 128, 129 and 130 which are separated each other with O-rings 131, 132, 133 and 134, forming separate circular pathes between bearing holder 127 and rear cover 121. Groove 128 connects path 32 for nozzles 28 to oil supplying path 116.

Figure 7:
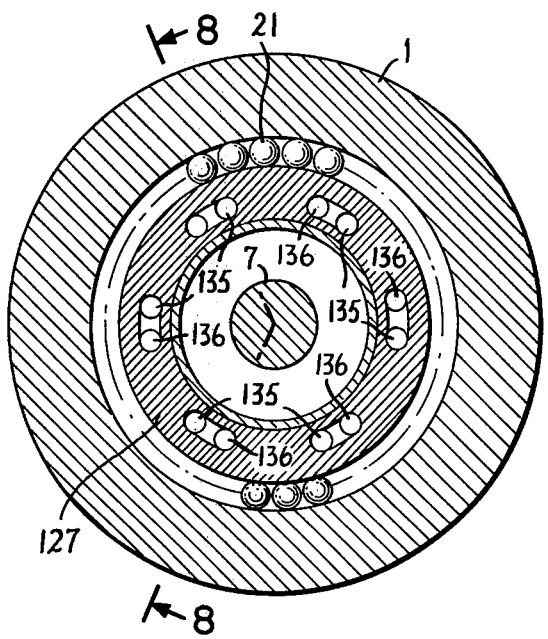
FIG. 7 is a cross-sectional view taken on line VII—VII in FIG. 6.
Figure 8:
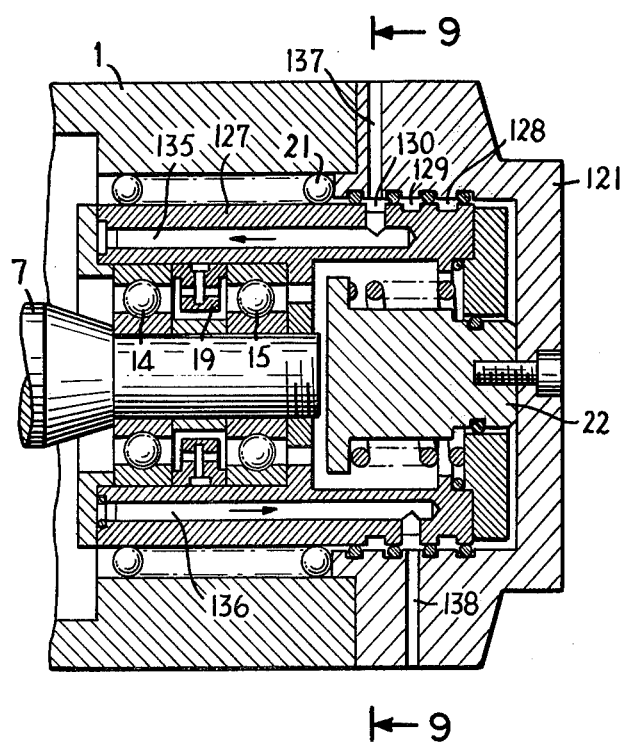
FIG. 8 is a partial sectional view taken on line VIII—VIII in FIG. 7.
Figure 9:
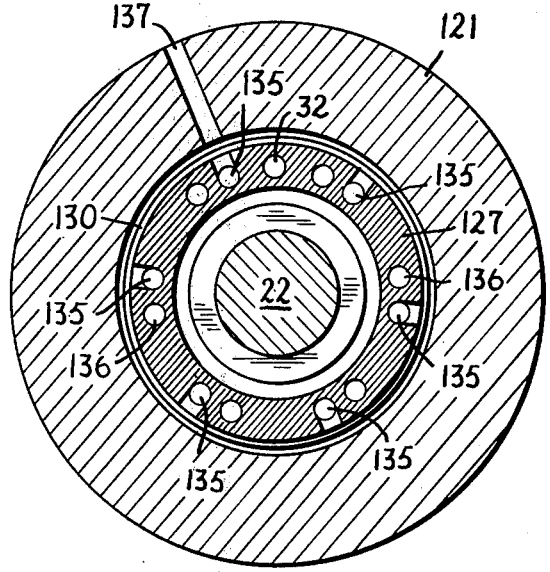
FIG. 9 is a cross-sectional view taken on line IX—IX in FIG. 8.

Bearing holder 127 has axial pathes 135 and 136 therein as shown in FIGS. 7, 8 and 9, for cooling bearing holder 127 itself. Axial pathes 135 and 136 are arranged parallel to each other on a pitch circle, each of pathes 135 being connected to an adjacent path 136 at the front end and being connected to an oil supplying path 137 through circular groove 130 at the rear end.

The rear end of each of axial pathes 136 is connected to an oil returning path 138 through circular groove 129 in a similar manner as axial pathes 135 to oil supplying path 137.

Oil supplying path 137 together with pathes 116 and 24 (in FIG. 5) is connected to oil supplying piping 71, while oil returning path 138 together with pathes 37 and 38 (in FIG. 5) is connected to oil recollecting piping 78, thereby permitting oil to circulate both through oil jet lubricating nozzles and through bearing holder cooling axial pathes 135 and 136.

Safety valve 123 serves to allow excessive pressurized air is sealed space 4 escape out.

What we claim is:

1. A spindle device with oil jet lubrication comprising: a housing having front and rear portions; a spindle disposed within said housing and having a nose portion protruding through a spindle opening in the housing front portion; bearings rotatably supporting said spindle in said housing; oil jet lubricating means for effecting oil jet lubrication of said bearings with pressurized lubricating oil, said means comprising an oil inlet in said housing for receiving pressurized lubricating oil, oil jet nozzles connected to said oil inlet and facing said bearings to jet oil thereon, and an oil outlet in a lower portion of said housing for enabling the drawing off of the jetted oil; air circulating means for circulating pressurized air past said spindle opening in said housing to seal said opening to prevent dust from entering therethrough into said housing; and means including an air outlet in an upper portion of said housing to effect exhaustion of pressurized air accumulated in said housing together with any oil mingled therein to thereby prevent undue pressurization of the air within said housing which would otherwise force oil out said spindle opening.

2. A spindle device as claimed in claim 1; including means connected to said air outlet receptive of the air flowing out therefrom for separating the oil from the air and returning the oil to said oil jet lubricating means to thereby prevent oil loss.

3. A spindle device as claimed in claim 1; further comprising an oil reservoir; an oil pressurizing pump connected to withdraw oil from said reservoir; first piping connecting said reservoir to said oil inlet; second piping connecting said oil pressurizing pump to said reservoir; and third piping connecting said air outlet to said reservoir and through which mingled oil in the air returns to said reservoir.

4. A spindle device as claimed in claim 3; further comprising a cooling water bath having immersed therein a coiled oil pipe and a coiled chilling pipe, said coiled oil pipe being inserted in said first piping so as to circulate lubricating oil therein, said coiled chilling pipe being connected to a chilling unit with piping so as to circulate therein a chilling medium; and means including a pump for circulating the water in said cooling water bath through said housing to cool the spindle assembly.

5. A spindle device as claimed in claim 1; wherein said bearings comprise at least two spaced apart bearing units, one of said units being held with its corresponding oil jet nozzles in a bearing holder; means mounting said bearing holder for longitudinally slidable movement in said housing; means axially urging said bearing holder in one direction to preload the bearings; and wherein said bearing holder has circulating cooling paths on the periphery thereof and which are connected to said oil jet lubricating means.

6. A spindle device as claimed in claim 5; including means for jetting the cooling oil passed through said circulating cooling paths out from the nozzles toward the corresponding bearings in said bearing holder.

7. A spindle device as claimed in claim 5; wherein said circulating cooling paths are arranged parallel with paths for the oil jet nozzles in said bearing holder.

8. A spindle device as claimed in claim 1; further comprising a safety valve connected to said housing and opening exteriorly thereof thereby permitting escape of over-pressurized gas from within said housing.

* * * * *